United States Patent
Li et al.

(10) Patent No.: US 8,793,476 B2
(45) Date of Patent: Jul. 29, 2014

(54) RESET CONTROL DEVICE, RESET CONTROL METHOD AND ELECTRONIC DEVICE

(75) Inventors: Chuan-Yuan Li, New Taipei (TW); Chien-Wen Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 521 days.

(21) Appl. No.: 13/214,248

(22) Filed: Aug. 22, 2011

(65) Prior Publication Data

US 2012/0293220 A1    Nov. 22, 2012

(30) Foreign Application Priority Data

May 19, 2011 (TW) .............................. 100117648 A

(51) Int. Cl.
*G06F 1/26* (2006.01)
*G06F 1/24* (2006.01)

(52) U.S. Cl.
CPC ........................................ *G06F 1/24* (2013.01)
USPC .............................................. 713/1; 713/300

(58) Field of Classification Search
None
See application file for complete search history.

(56) References Cited

U.S. PATENT DOCUMENTS

| 5,598,567 A | 1/1997 | Ninomiya |
| 2006/0091853 A1* | 5/2006 | Briggs et al. ................ 320/114 |
| 2009/0144823 A1* | 6/2009 | Lamastra et al. ............. 726/22 |
| 2010/0146318 A1* | 6/2010 | Johnson et al. .............. 713/340 |

FOREIGN PATENT DOCUMENTS

| CN | 101022623 A | 8/2007 |
| CN | 101751098 | 6/2010 |
| TW | 224748 | 6/1994 |

OTHER PUBLICATIONS

Office action mailed on Nov. 13, 2013 for the Taiwan application No. 100117648, filing date: May 19, 2011, p. 2-3 and p. 4 line 1-15.
Office action mailed on Mar. 11, 2014 for the China application No. 201110150357.4, p. 3 line 4-20, line 22-34 and line 36-37 and p. 4 line 1-16 and line 18-20.

* cited by examiner

*Primary Examiner* — Paul Yanchus, III
(74) *Attorney, Agent, or Firm* — Winston Hsu; Scott Margo

(57) ABSTRACT

A reset control device for an electronic device having a battery for providing operating power for a system circuit is provided. The reset control device includes a signal generating unit for generating a control signal, and a control module installed in the battery and coupled to the signal generating unit for disconnecting a power supply link between the battery and the system circuit for a predetermined duration and recovering the power supply link, when the control signal conforms to a predefined rule, so as to reset the system circuit.

17 Claims, 3 Drawing Sheets

RESET CONTROL DEVICE, RESET CONTROL METHOD AND ELECTRONIC DEVICE

BACKGROUND OF THE INVENTION

1. Field of the Invention

The present invention relates to a reset control device, a reset control method and an electronic device, and more particularly, to a reset control device, a reset control method and an electronic device for accurately executing a reset procedure.

2. Description of the Prior Art

As the advancement of technology, portable electronic devices, such as laptops, mobile phones, cameras and MP3 players, are utilized more frequently in daily life. However, as a portable electronic device has more functions, system operations thereof become more complex. Therefore, the portable electronic device may easily suffer from design defects or operation errors, which may cause malfunctions in firmware, application or BIOS, and lead to abnormal power supply or system crash. In such a condition, there is a need for proper rescue measures.

In general, for portability, the portable electronic device is equipped with a rechargeable battery for storing electricity required by normal operations of the portable electronic device. In other words, if the rechargeable battery is temporarily disconnected for a while and reconnected at once, the portable electronic device is turned off and rebooted after a power supply button is pressed, i.e. a restart procedure is executed. However, such an operation is inconvenient. Besides, some portable electronic device of the prior art is equipped with a built-in rechargeable battery, meaning that the rechargeable battery cannot be removed arbitrarily, and a reset button is added to trigger the restart of operating system, so as to achieve the reset procedure. That is, when the reset button is pressed, system power keeps supplied, while controllers, such as a keyboard controller, will restart system programs.

SUMMARY OF THE INVENTION

It is therefore an objective of the present invention to provide a reset control device, a reset control method and an electronic device.

One aspect of the present invention discloses a reset control device for an electronic device. The electronic device has a battery for providing operating power for a system circuit. The reset control device includes a signal generating unit, for generating a control signal; and a control module, installed in the battery and coupled to the signal generating unit, for disconnecting a power supply link between the battery and the system circuit for a predetermined duration and recovering the power supply link when the control signal conforms to a predefined rule, so as to reset the system circuit.

Another aspect of the present invention further discloses a reset control method for an electronic device. The electronic device has a battery for providing operating power for a system circuit. The reset control method includes receiving a control signal, and disconnecting a power supply link between the battery and the system circuit for a predetermined duration and recovering the power supply link when the control signal conforms to a predefined rule, so as to reset the system circuit.

Another aspect of the present invention further discloses an electronic device. The electronic device includes a system circuit, a battery, for providing operating power for the system circuit, and a reset control device, including a signal generating unit, for generating a control signal, and a control module, installed in the battery and coupled to the signal generating unit, for disconnecting a power supply link between the battery and the system circuit for a predetermined duration and recovering the power supply link when the control signal conforms to a predefined rule, so as to reset the system circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
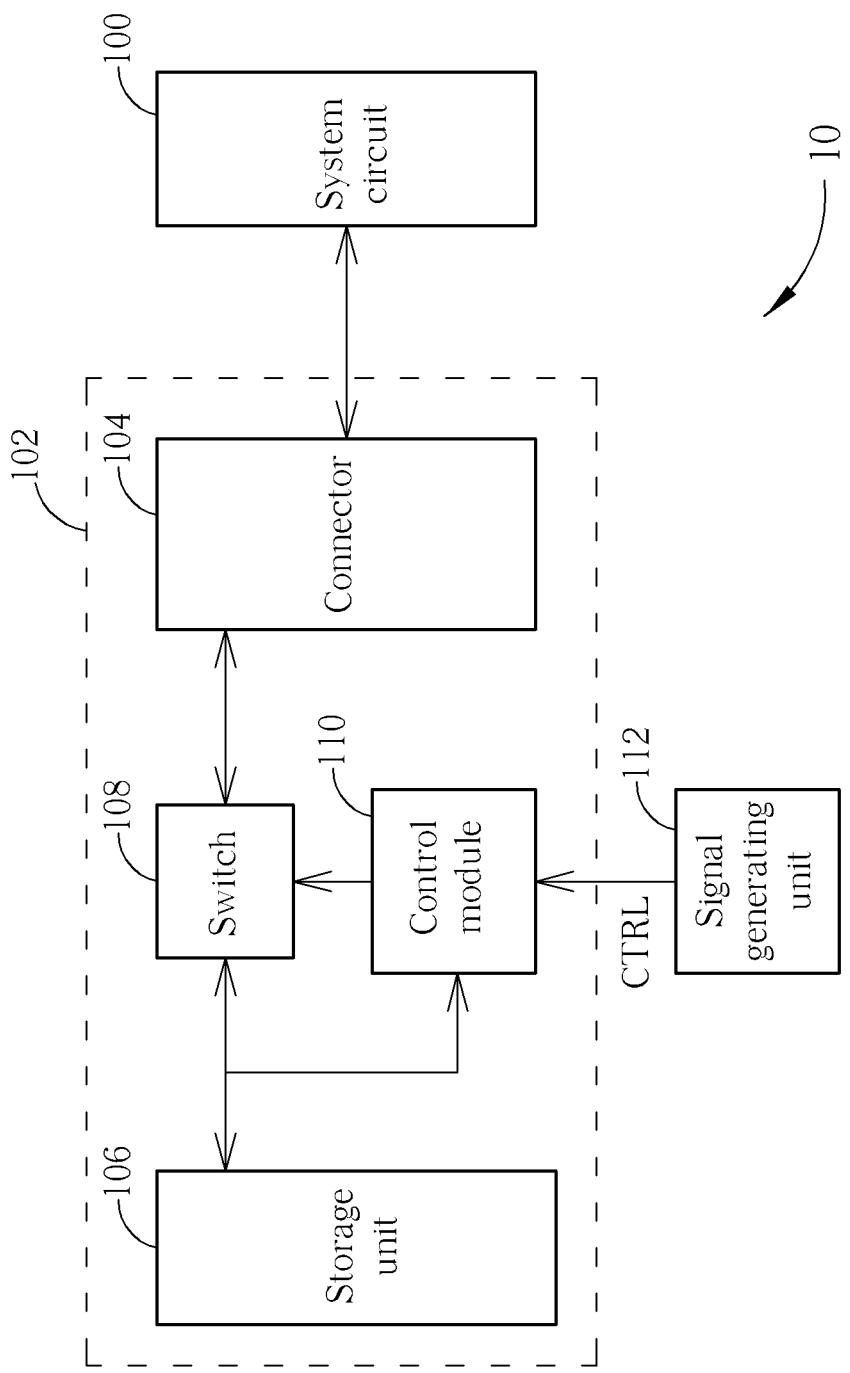
FIG. 1 illustrates a schematic diagram of an electronic device according to an embodiment of the present invention.

Please refer to FIG. 1, which illustrates a schematic diagram of an electronic device 10 according to an embodiment of the present invention. The electronic device 10 can be a laptop, mobile phone, camera, MP3 player or any portable electronic device, where a battery 102 supplies operation power for a system circuit 100. In detail, the battery 102 and the system circuit 100 are connected via a connector 104. When the connector 104 and the system circuit 100 are connected correctly, a storage unit 106 discharges electricity to the system circuit 100 to provide the operation power. Besides, a switch 108 is set between the storage unit 106 and the connector 104, and controlled by a control module 110 for switching a power supply link between the storage unit 106 and the connector 104. An operating principle of the control module 110 controlling the switch 108 is based on whether a control signal CTRL generated by a signal generating unit 112 conforms to a predefined rule. When the control signal CTRL generated by the signal generating unit 112 conforms to the predefined rule, the control module 110 turns off the switch 108 for a predetermined duration and recovers the power supply link, so as to reset the system circuit 100. In other words, the combination of the control module 110 and the signal generating unit 112 realizes a reset control device.

In short, when a user intends to reset the system circuit 100, the user can utilize the signal generating unit 112 to generate the control signal CTRL conforming to the predefined rule, and accordingly, the control module 110 turns off the switch 108 for the predetermined duration and turns on the switch 108 at once. Since the switch 108 is installed in the power supply link between the storage unit 106 and the system circuit 100, when the switch 108 is turned off and turned on, the system circuit 100 is correspondingly turned off and turned on, i.e. a reset procedure is finished. In other words, the present invention switches power supply, to directly control power of the system circuit 100, to achieve the purpose of reset.

Noticeably, FIG. 1 is to illustrate the conception of the present invention, and all numerous modifications and alterations based on the present invention are the scope of the present invention, and are not limited hereinafter. For example, the method of the signal generating unit 112 generating the control signal CTRL is not limited, and the predefined rule mentioned in the above can be properly adjusted according to realization of the signal generating unit 112. For example, if the signal generating unit 112 is realized by a button, the predefined rule can be a period of the button being continuously enabled exceeds a predefined value, such as 4 seconds. In such a condition, the signal generating unit 112 can be realized by an original button of the system circuit 100, such as a power supply button. That is, when a period of the power supply button being pressed exceeds 4 seconds, the control module 110 determines the control signal CTRL generated by the signal generating unit 112 conforms to the predefined rule, so as to turn off the switch 108 and turn on the switch 108 again.

In addition, the signal generating unit 112 can be realized by a plurality of buttons, and the predefined rule can be the plurality of buttons are simultaneously enabled. For example, suppose the electronic device 10 is a laptop, the signal generating unit 112 is composed of buttons F1, F2 and F3 of the laptop, and the predefined rule is the buttons F1, F2 and F3 are simultaneously pressed. In such a condition, when the user wants to reset the laptop, the user can achieve the reset procedure by simultaneously pressing the buttons F1, F2 and F3, such that the power supply link is disconnected and recovered. Besides, as shown in FIG. 1, the battery 102 can be any type of battery, e.g. alkaline battery or rechargeable battery.

Figure 2:
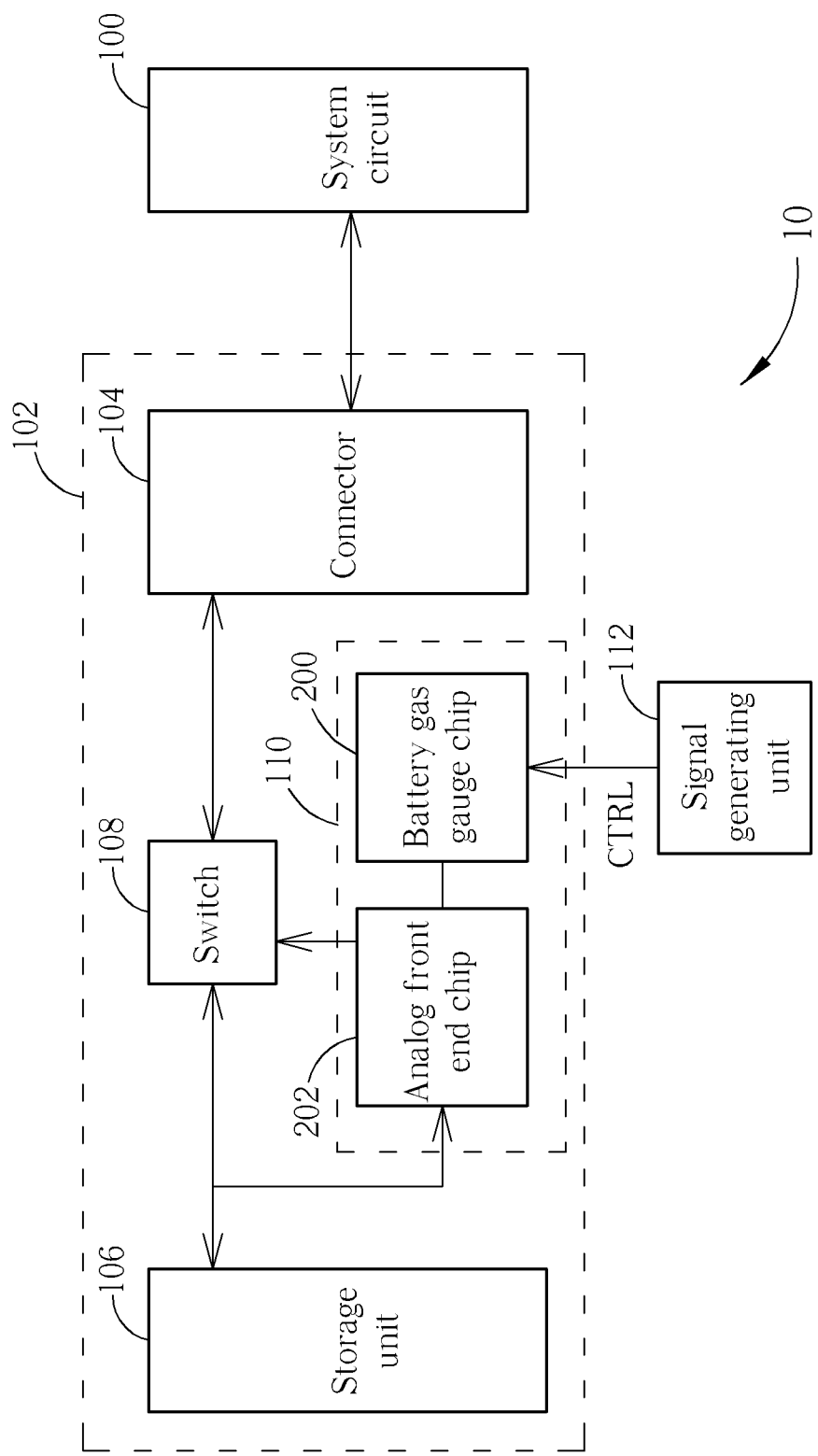
FIG. 2 illustrates a schematic diagram of realizing a control module of the electronic device shown in FIG. 1 by a battery gas gauge chip and an analog front end chip.

On the other hand, the control module 110 is installed in the battery 102, and may comprise more than one control unit. For example, as shown in FIG. 2, the control module 110 comprises a battery gas gauge chip 200 and an analog front end (AFE) chip 202. The battery gas gauge chip 200 can monitor a capacity of the storage unit 106 as well as determine whether the control signal CTRL conforms to the predefined rule. When a determined result generated by the battery gas gauge chip 200 indicates the control signal CTRL conforms to the predefined rule, the AFE chip 202 turns off the switch 108 for the predetermined duration and turns on the switch 108, to finish the reset procedure.

Figure 3:
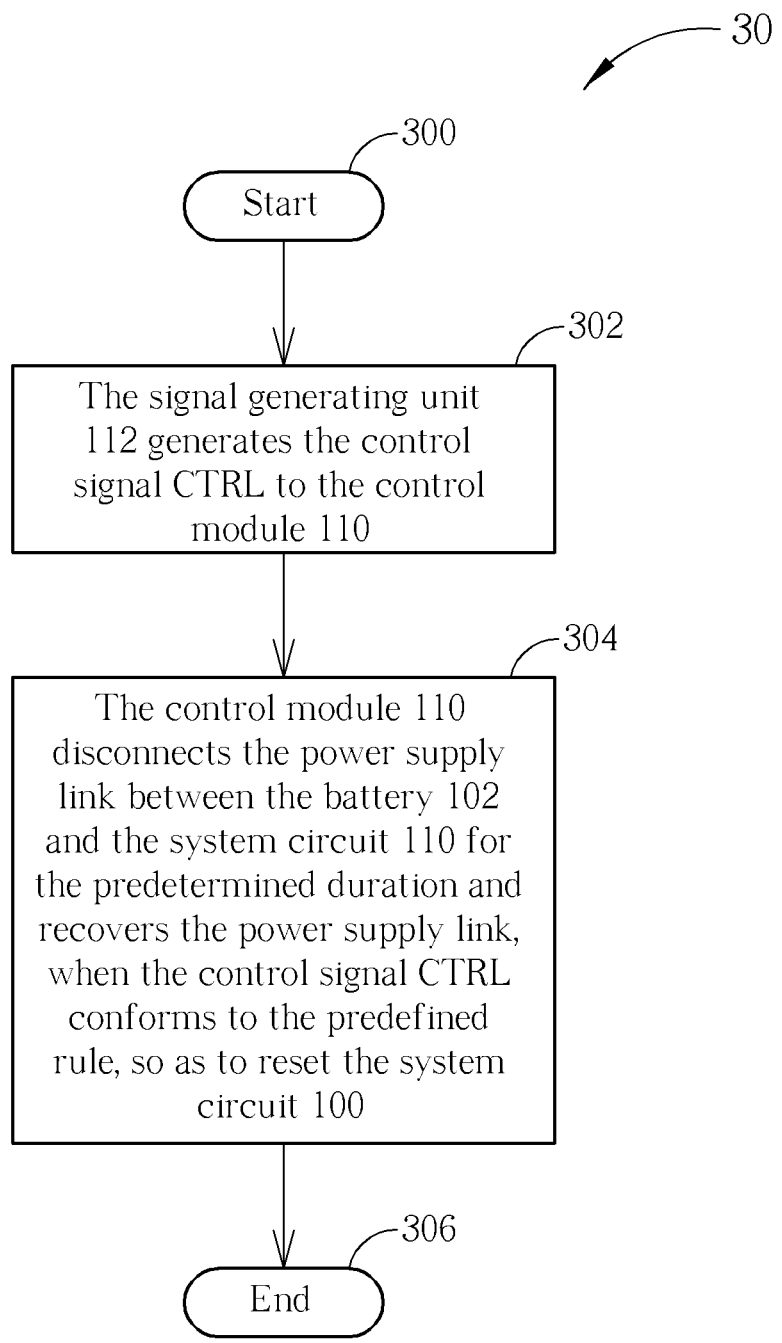
FIG. 3 illustrates a schematic diagram of a reset control process according to an embodiment of the present invention.

Operations of the control module 110 and the signal generating unit 112 can further be summarized into a reset control process 30 as shown in FIG. 3. The reset control process 30 comprises the following steps:

Step 300: Start.

Step 302: The signal generating unit 112 generates the control signal CTRL to the control module 110.

Step 304: The control module 110 disconnects the power supply link between the battery 102 and the system circuit 110 for the predetermined duration and recovers the power supply link, when the control signal CTRL conforms to the predefined rule, so as to reset the system circuit 100.

Step 306: End.

Detail illustration and alteration of the reset control process 30 are referred in the above, and are not narrated hereinafter.

In the prior art, although the reset button can reset the portable electronic device, there is a need to add the corresponding button onto the housing, which limits flexibility of the external design. In comparison, the present invention can determine whether to disconnect the power supply link and to recover the power supply link, i.e. reset the portable electronic device, according to the predefined rule, such as whether a button is continuously enabled or whether a plurality of buttons are simultaneously enabled. Therefore, the reset button is not needed, so as to increase flexibility of the external design.

Those skilled in the art will readily observe that numerous modifications and alterations of the device and method may be made while retaining the teachings of the invention.

What is claimed is:

1. A reset control device for an electronic device, the electronic device having a battery for providing operating power for a system circuit, the reset control device comprising:
   a signal generating unit, for generating a control signal; and
   a control module, installed in the battery and coupled to the signal generating unit, for disconnecting a power supply link between the battery and the system circuit for a predetermined duration and recovering the power supply link, when the control signal conforms to a predefined rule, so as to reset the system circuit.

2. The reset control device of claim 1, wherein the signal generating unit comprises a button, and the predefined rule is a period of the button being continuously enabled exceeds a predefined value.

3. The reset control device of claim 1, wherein the signal generating unit comprises a plurality of buttons, and the predefined rule is the plurality of buttons are simultaneously enabled.

4. The reset control device of claim 1, wherein the battery comprises a switch installed on the power supply link, and the control module switches the switch, so as to disconnect the power supply link for the predetermined duration and recover the power supply link.

5. The reset control device of claim 4, wherein the control module comprises:
   a first control unit, installed in the battery and coupled to the signal generating unit, for determining whether the control signal conforms to the predefined rule and generating a determined result accordingly; and
   a second control unit, coupled to the first control unit and the switch, for turning off the switch for the predetermined duration and turning on the switch, when the determined result indicates that the control signal conforms to the predefined rule.

6. The reset control device of claim 5, wherein the first control unit is a battery gas gauge chip, for monitoring a capacity of the battery.

7. The reset control device of claim 5, wherein the second control unit is an Analog Front End (AFE) chip.

8. A reset control method for an electronic device, the electronic device having a battery for providing operating power for a system circuit, the reset control method comprising:
   receiving a control signal; and
   a control module installed in the battery disconnecting a power supply link between the battery and the system circuit for a predetermined duration and recovering the power supply link, when the control signal conforms to a predefined rule, so as to reset the system circuit.

9. The reset control method of claim 8, wherein the control signal is generated by a button, and the predefined rule is a period of the button being continuously enabled exceeds a predefined value.

10. The reset control method of claim 8, wherein the control signal is generated by a plurality of buttons, and the predefined rule is the plurality of buttons are simultaneously enabled.

11. An electronic device comprising:
   a system circuit;
   a battery, for providing operating power for the system circuit; and
   a reset control device, comprising:
      a signal generating unit, for generating a control signal; and
      a control module, installed in the battery and coupled to the signal generating unit, for disconnecting a power supply link between the battery and the system circuit for a predetermined duration and recovering the power supply link, when the control signal conforms to a predefined rule, so as to reset the system circuit.

12. The electronic device of claim 11, wherein the signal generating unit comprises a button, and the predefined rule is a period of the button being continuously enabled exceeds a predefined value.

13. The electronic device of claim 11, wherein the signal generating unit comprises a plurality of buttons, and the predefined rule is the plurality of buttons are simultaneously enabled.

14. The electronic device of claim 11, wherein the battery comprises a switch installed on the power supply link, and the control module switches the switch, so as to disconnect the power supply link for the predetermined duration and recover the power supply link.

15. The electronic device of claim 14, wherein the control module comprises:
 a first control unit, installed in the battery and coupled to the signal generating unit, for determining whether the control signal conforms to the predefined rule and generating a determined result accordingly; and
 a second control unit, coupled to the first control unit and the switch, for turning off the switch for the predetermined duration and turning on the switch, when the determined result indicates that the control signal conforms to the predefined rule.

16. The electronic device of claim 15, wherein the first control unit is a battery gas gauge chip, for monitoring a capacity of the battery.

17. The electronic device of claim 15, wherein the second control unit is an Analog Front End (AFE) chip.

* * * * *